United States Patent [19]
Jadach

[11] Patent Number: 5,179,788
[45] Date of Patent: Jan. 19, 1993

[54] LOCATING PLUG FOR THE CENTERLINES OF HOLES

[76] Inventor: Albert A. Jadach, 1820 Vinton, Royal Oak, Mich. 48067

[21] Appl. No.: 881,197

[22] Filed: May 11, 1992

[51] Int. Cl.$^5$ ............................................. G01D 21/00
[52] U.S. Cl. .......................................... 33/644; 33/520; 33/613
[58] Field of Search ................. 33/644, 520, 533, 613, 33/645

[56] References Cited

U.S. PATENT DOCUMENTS

| | | | |
|---|---|---|---|
| 2,679,692 | 6/1954 | Fortner et al. | 33/613 |
| 2,686,371 | 8/1954 | Flis | 33/520 |
| 3,026,621 | 3/1962 | Papps et al. | 33/520 |
| 4,485,453 | 11/1984 | Taylor | 33/613 |

Primary Examiner—William A. Cuchlinski, Jr.
Assistant Examiner—C. W. Fulton
Attorney, Agent, or Firm—Krass & Young

[57] ABSTRACT

A fixture for use with a programmable coordinate measuring machine to determine the centerline of a threaded hole formed in a workpiece from a planar surface and the distance between the centerlines of two similar holes, consists of a plug having a cylindrical section threaded to mate with the hole. A cylindrical head section formed concentrically with the threaded section and of greater diameter, has a counterbore formed at one end, concentrically with the centerline if the threaded section. A probe of a programmable coordinate measurement machine may be moved into the cylindrical bore and brought into contact with three spaced points on the interior diameter of the bore with three straight line motions. A coordinate measurement machine calculates the centerline of bore and thus the centerline of the threaded hole from these three measurements. By moving the probe into the bore of the second similar fixture located in the second hole, and determining the centerline of the second hole, the distance between the two centerlines may be calculated by the programmable coordinate measurement machine.

6 Claims, 1 Drawing Sheet

LOCATING PLUG FOR THE CENTERLINES OF HOLES

FIELD OF THE INVENTION

This invention relates to a fixture which may be inserted into a threaded hole in a workpiece to allow a programmable coordinate measurement machine to be used to determine the centerline of the threaded hole and to a method of determining the centerline of a hole and the distance between the centerlines of two threaded holes, using such fixtures.

BACKGROUND OF THE INVENTION

Programmable, touch probe coordinate measuring machines are used for inspections of machined metal parts to insure compliance with design parameters. These machines move a probe through a predetermined path, under direction of a numerical control system, to contact workpiece surfaces. They may be used to determine the centerline of a bored holes and the distances between the centerlines of two bored holes by contacting three or more spaced points on the interior diameter of the hole and using those dimensions to calculate the center line. However, when the hole is threaded this contact technique is impractical. To overcome this problem, hole location plugs have been developed which incorporate a threaded section adapted to screw into the hole and a concentric cylindrical stem which extends above the hole. The coordinate measurement machine is programmed to contact three points on the outer diameter of the stem and use the coordinates of these points to calculate the center line of the stem and thus of the threaded hole.

Two problems are encountered in the use of these stemmed hole location plugs. First, in order to contact three spaced points on the outer diameter of the stem the system must be programmed to cause the touch probe to undergo at least six movements: the probe must be moved into contact with one point of the stem and then moved out of contact before it can be moved into contact with a second point. These multiple motions substantially slow the process of the inspection of bored holes using the stem-type plugs. Second, in order to provide sufficient clearance for the probe motion without contacting other parts of the workpiece surface, the stem must extend a fair distance above the workpiece surface, typically an inch or so. If the relatively thin plug stem is not absolutely concentric with the plug section that threads into the hole to be measured, the precision of the centerline measurement will be diminished.

SUMMARY OF THE INVENTION

The present invention relates to an improved form of hole location plug for use with touch probe coordinate measuring machines and to a method of measuring the centerline of a threaded hole and the distance between the centerlines of two threaded holes formed at separated points on a workpiece surface, using the plug of the present invention. The plug of the present invention incorporates a threaded section adapted to be screwed into a workpiece hole to be gauged. The plug includes a larger diameter head that extends above the workpiece surface and is formed with a counterbore having a bottom surface spaced from the workpiece surface by only a fraction of an inch. The centerline of a hole fitted with the plug may be measured by programming the probe to move into the counterbore along a line parallel to the centerline of the hole and then move radially into contact with three or more points on the interior diameter of the counterbore. The probe may be moved directly from one point contact to the next point contact in a single straight line so that only three moves in a plane normal to the nominal centerline are required to determine the centerline of the plug and thus the centerline of the threaded hole in the workpiece.

Since the interior diameter of the counterbore is known, the same three measurements may be used by the coordinate measurement machine to calculate the interior diameter of the counterbore and compare it with the known interior diameter, thus validating the three contacts used to measure the centerline. If the calculated ID differs from the known ID of the counterbore of the plug, the machine repeats the measurement process.

Since the surfaces of the counterbore which are contacted by the probe are almost flush with the workpiece surface, they provide a high precision indication of the hole's centerline.

DESCRIPTION OF THE DRAWINGS

Other objectives, advantages and applications of the present invention will be made apparent by the following detailed description of the preferred embodiment of the invention. The description makes reference to the accompanying drawings in which.

DETAILED DESCRIPTION OF THE PREFERRED EMBODIMENT

Figure 1:
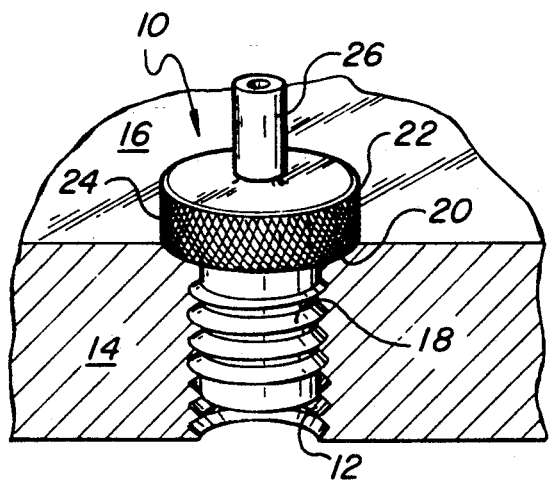
FIG. 1 is a partially perspective, partially cross-sectional view of a hole location plug formed in accordance with the prior art, disposed within a hole in a workpiece.

Referring to FIG. 1, the prior art probes, generally indicated 10, like the probes of the present invention, are used to calculate the centerline of a threaded hole 12 formed in a workpiece 14. The hole 12 is generally formed normally to a workpiece surface 16.

The prior art hole location plug 10 includes an extending threaded section 18 adapted to be screwed into the threaded hole 12 in the workpiece until a shoulder 20 formed at the lower end of head 22 abuts the workpiece surface 16. The outer diameter of the head 22 is preferably knurled at 24 to provide an improved grip. An elongated cylindrical stem section 26 projects upwardly from the head 22 and has a sufficient length to allow the probe of a computer measuring machine (not shown) to contact the sides of the stem. For example, the stem may extend one inch above the shoulder 20.

Figure 2:
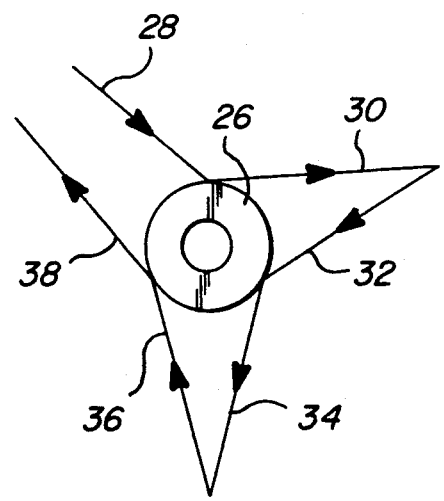
FIG. 2 is a schematic view of the probe motions required to gauge the centerline of a hole using the prior art hole location plug of FIG. 1.

FIG. 2 illustrates the probe motions necessary to contact three circumferentially spaced points on the stem 26 in order to calculate the centerline of the stem and thus the centerline of the hole 12. Typically, the probe may be programmed to move along line 28 into contact with one point on the stem surface. The probe then must be moved away from the stem, along line 30, for a sufficient distance to allow a return movement, along line 32, so as to contact the second point on the stem, displaced by about 120° from the first point. A similar set of motions along lines 34 and 36 are required to bring the probe into contact with a third diametrically spaced point. A motion on line 38 separates the probe from the stem.

Figure 3:
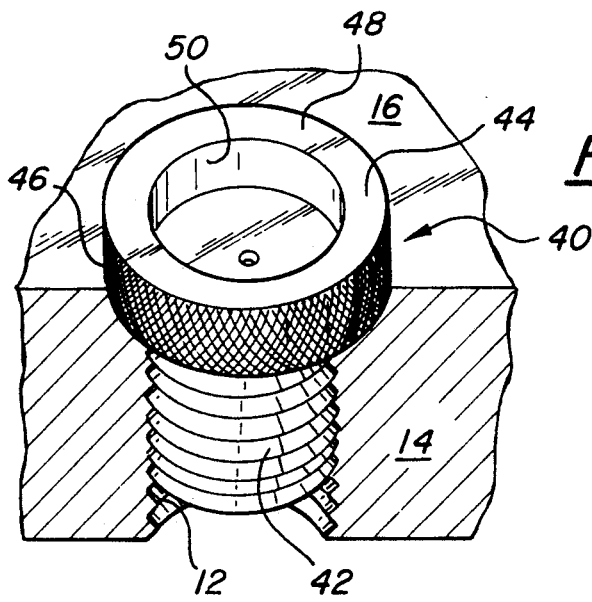
FIG. 3 is a partially schematic, partially sectional view of a hole location plug formed in accordance with the present invention, disposed within a workpiece.
Figure 4:
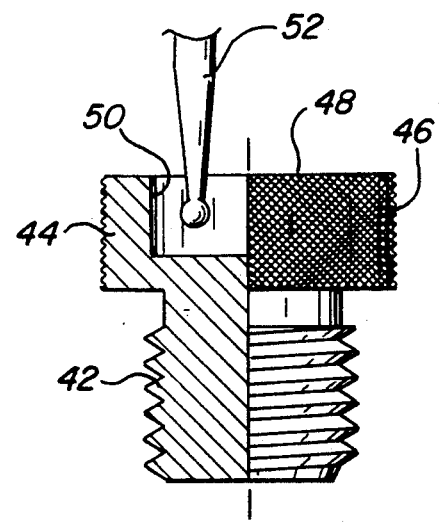
FIG. 4 is a partially sectioned elevation view of the hole plug of FIG. 3, illustrating a probe of a coordinate measuring machine disposed within the counterbore.

The plug of the present invention, generally indicated at 40 in FIGS. 3 and 4, includes a threaded plug section 42 which mates with the threaded hole 12 formed in the workpiece 14. A larger diameter head section 44 is knurled as at 46, on its outer diameter to assist in screwing the section 42 into the hole 12. The head 44 has a flat upper surface 48 formed with a counterbore 50. The counterbore has cylindrical walls concentric with the centerline of the plug 40.

Figure 5:
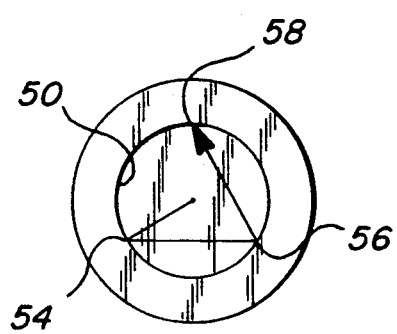
FIG. 5 is a schematic diagram illustrating the probe motions employed to measure a hole center using the hole location plug of the present invention.

A probe 52, of a coordinate measurement machine illustrated in FIG. 4, may be moved into the counterbore 50 and then brought into contact with three circumferentially spaced points 54, 56 and 58, by three direct motions as illustrated in FIG. 5. Thus, the measuring operation is substantially shorter than the operation required with use of the prior art plug 10. Also, the cylindrical surface 50 of the counterbore which is contacted by the probe 52 may be very closely spaced to the surface 16 of the workpiece, minimizing the possibility of deviation of the cylindrical surface 50 from absolute concentricity to the centerline of the hole 12.

The plugs 40 of the present invention are preferably provided in sets with differing size threaded ends 42, but all with the same diameter counterbore. The coordinate measurement machine may therefore be simply programmed to calculate the diameter of the counterbore 50 and compare it with the known, constant diameter, to verify the three point contacts used to calculate the centerline of the threaded hole 12.

A pair of the plugs 40 may be used with a pair of spaced holes formed in the surface 16 to determine the distance between the centerlines of the two holes.

Having thus described my invention, I claim:

1. A fixture for use in locating the centerline of a cylindrical hole formed in a workpiece through use of a programmable coordinate measurement machine, said fixture comprising:
 a cylindrical section having an outer diameter approximating the inner diameter of the hole, adapted to be inserted into said hole;
 a head section of greater dimension than the cylindrical section joined to the cylindrical section in a substantially transverse, planar shoulder adapted to abut the workpiece surface surrounding the hole when the cylindrical section is inserted within the hole; and
 a cylindrical counterbore formed in the surface of the plug head section opposite to the shoulder section, the cylindrical counterbore being formed concentrically with the centerline of the cylindrical section, whereby the probe of a programmable coordinate measurement machine may be moved into the counterbore and brought into contact with three spaced points on the interior diameter of the counterbore with three programmed motions so that the coordinate measurement machine can calculate the centerline of the counterbore and accordingly, the centerline of the cylindrical hole.

2. The fixture of claim 1 in which the hole is threaded and the cylindrical section of a fixture is threaded in a complementary manner to the hole so that the cylindrical extending section may be threaded into the hole.

3. The fixture of claim 1 in which the head section is cylindrical and concentric with the centerline of the cylindrical section.

4. A fixture useful in connection with a programmable coordinate measurement machine to determine the centerline of a threaded hole formed in a workpiece comprising:
 an elongated cylindrical member threaded at one end in a manner complimentary to the thread of the hole so that the end of the cylindrical member may be threadedly inserted into the hole with one end of the fixture extending beyond the surface of the hole; and
 a cylindrical counterbore formed on the centerline of the cylindrical member from the end opposite that which threads into the hole, whereby the fixture may be threaded into the hole, and a probe of a programmable coordinate measurement machine moved into the counterbore and brought into contact with three opposed points in the counterbore with three programmed motions so that the coordinate measurement machine can calculate the centerline of the counterbore and accordingly the centerline of the threaded hole.

5. The method of determining the centerline of a threaded hole formed in a workpiece, comprising:
 placing a fixture having a cylindrical section threaded to mate with the threads of the hole and an extending section formed with a counterbore concentric to the centerline of the cylindrical section into the hole by threading the cylindrical section into the hole, and bringing a programmable coordinate measurement machine into the counterbore and into successive contact with three spaced points about the counterbore by three programmed straight line motions in order to determine the coordinates of the centerline of the counterbore and thus the center bore of the threaded hole in the workpiece.

6. The method of determining the distance between the centerlines of two threaded holes formed at spaced points at a planar surface of a workpiece, using a programmable coordinate measurement machine, comprising:
 placing locating fixtures into each of the holes, the locating fixtures each having a cylindrical section threaded to mate with the threaded hole and each having a head section formed with a counterbore, the counterbore being concentric with the cylindrical section, bringing the probe of a programmable coordinate measurement machine into one of the counterbores and moving the probe into contact with three spaced points on the surface of the counterbore, moving the probe into the counterbore on the second fixture and contacting three spaced points on the interior diameter of the counterbore of the second fixture, and calculating the centerlines of the two spaced holes and the distance between the centerlines.

* * * * *